(12) United States Patent
Hwang et al.

(10) Patent No.: US 8,483,106 B2
(45) Date of Patent: Jul. 9, 2013

(54) APPARATUS AND METHOD FOR COMPENSATING FOR PHASE ERROR IN WIRELESS COMMUNICATION SYSTEM

(75) Inventors: Sung-Soo Hwang, Yongin-si (KR); Seung-Hee Han, Hwaseong-si (KR); Sang-Boh Yun, Seongnam-si (KR); Joo-Hyun Lee, Suwon-si (KR); Sung-Yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 12/766,109

(22) Filed: Apr. 23, 2010

(65) Prior Publication Data

US 2010/0271932 A1 Oct. 28, 2010

(30) Foreign Application Priority Data

Apr. 24, 2009 (KR) ........................ 10-2009-0035984

(51) Int. Cl.
*H04B 7/14* (2006.01)
*H04B 3/36* (2006.01)
*H04B 1/60* (2006.01)

(52) U.S. Cl.
USPC ................... 370/279; 370/315; 455/7; 455/9; 375/211

(58) Field of Classification Search
USPC .. 370/203–210, 279, 310–350, 470; 375/295, 375/260, 267, 296, 309; 455/7, 9, 11.1, 41.1, 455/41.2, 424, 435.2, 443–449, 456.1–456.6, 455/507, 524
See application file for complete search history.

(56) References Cited

U.S. PATENT DOCUMENTS

| | | | |
|---|---|---|---|
| 7,792,207 B2* | 9/2010 | Harel et al. | 375/267 |
| 8,155,046 B2* | 4/2012 | Jung et al. | 370/315 |
| 8,249,187 B2* | 8/2012 | Harel et al. | 375/295 |
| 2005/0099939 A1* | 5/2005 | Huh et al. | 370/210 |
| 2006/0182015 A1* | 8/2006 | Kim | 370/203 |
| 2006/0227909 A1 | 10/2006 | Thomas et al. | |
| 2008/0075205 A1* | 3/2008 | Lee et al. | 375/343 |
| 2009/0110032 A1* | 4/2009 | Yuan | 375/130 |
| 2009/0207776 A1* | 8/2009 | Baik et al. | 370/315 |
| 2010/0266063 A1* | 10/2010 | Harel et al. | 375/267 |
| 2010/0272005 A1* | 10/2010 | Larsson et al. | 370/315 |

FOREIGN PATENT DOCUMENTS

| | | |
|---|---|---|
| KR | 10-2008-0028625 A | 4/2008 |
| WO | 2008/004916 A1 | 1/2008 |
| WO | 2008/108528 A1 | 9/2008 |

* cited by examiner

*Primary Examiner* — Habte Mered
(74) *Attorney, Agent, or Firm* — Jefferson IP Law, LLP

(57) ABSTRACT

An apparatus and method for compensating for a phase error in a wireless communication system are provided. The apparatus includes a reception modem, a transmission modem, a Common Phase Error (CPE) compensator, a first channel estimator, a phase compensator, and a second channel estimator. The reception modem demodulates and decodes a signal received. The transmission modem encodes and modulates a signal for transmission. The CPE compensator compensates for phase errors of at least two symbols constituting a signal. The first channel estimator estimates channels for respective bursts. The phase compensator compares phases for the channels for the respective bursts with each other and compensates for a phase difference between at least two bursts. The second channel estimator estimates an interference channel.

19 Claims, 7 Drawing Sheets

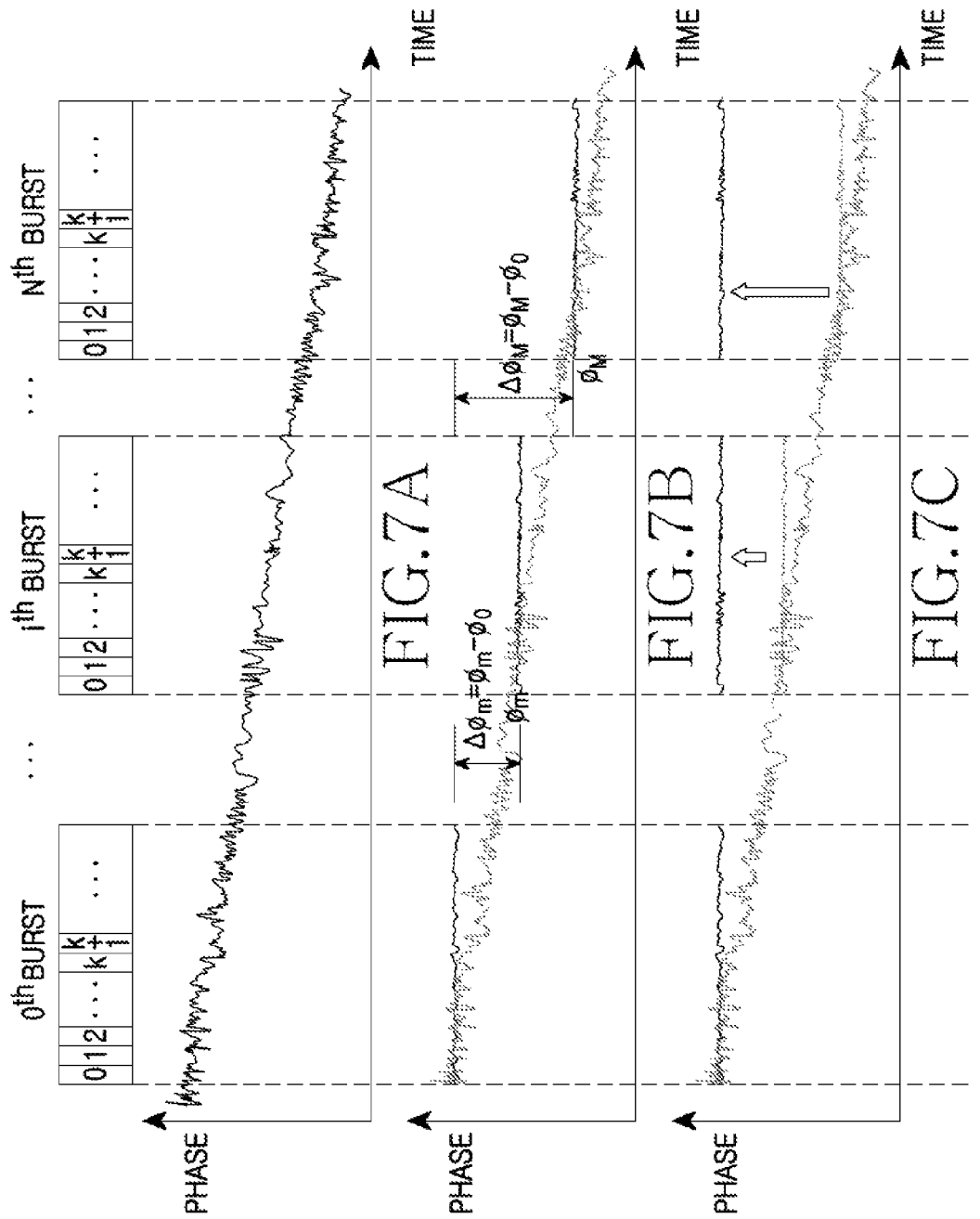

APPARATUS AND METHOD FOR COMPENSATING FOR PHASE ERROR IN WIRELESS COMMUNICATION SYSTEM

PRIORITY

This application claims the benefit under 35 U.S.C. §119(a) of a Korean patent application filed in the Korean Intellectual Property Office on Apr. 24, 2009 and assigned Serial No. 10-2009-0035984, the entire disclosure of which is hereby incorporated by reference.

BACKGROUND OF THE INVENTION

1. Field of the Invention

Aspects of the present invention relate to an apparatus and method for compensating for a phase error in a wireless communication system. More particularly, aspects of the present invention relate to an apparatus and method for compensating for a phase error of a self interference channel or an inter-antenna interference channel in a Relay Station (RS) of a wireless communication system using a Full Duplex Relay (FDR) scheme.

2. Description of the Related Art

In order to provide wireless channels to Mobile Stations (MSs) located in an edge or a shadow area of a cell, wireless communication systems provide relay services. For example, the wireless communication system relays a signal, which is transmitted/received between a Base Station (BS) and an MS, using a Relay Station (RS) as illustrated in FIG. 1 below.

FIG. 1 illustrates a construction of a wireless communication system for providing a relay service according to the related art.

As illustrated in FIG. 1, the wireless communication system includes a BS 100, an RS 110, and MSs 101 and 111.

The BS 100 performs direct communication with the MS1 101 located in a service area, and performs communication with the MS2 111 located out of the service area using the RS 110.

In a case of providing the relay service as above, the RS 110 supports the relay service using a Half Duplex Relay (HDR) scheme or a Full Duplex Relay (FDR) scheme.

In a case of using the HDR scheme, the RS 110 separates channel resources for performing communication with the BS 100 from channel resources for performing communication with the MS2 111, for use. Thus, frequency efficiency is lowered.

In a case of using the FDR scheme, the RS 110 performs communication with the MS2 111 using the same channel resources as channel resources for performing communication with the BS 100. For example, in the case of using the FDR scheme, the RS 110 performs communication with the MS2 111 using the same time resources as time resources for performing communication with the BS 100.

That is, in the case of using the FDR scheme, the RS 110 receives a signal from the BS 100 while transmitting a signal to the MS2 111, or receives a signal from the MS2 111 while transmitting a signal to the BS 100. Thus, a self interference or an inter-antenna interference occurs.

As a result, the RS 110 cannot provide the relay service in the FDR scheme until canceling the self interference or the inter-antenna interference. The RS 110 is aware of a signal, which it transmits. Thus, the RS 110 uses the transmit signal as a pilot to estimate an interference channel functioning as interference of a receive signal. For example, the RS 110 estimates a channel in a unit of burst.

In a case where the wireless communication system providing the relay service uses an OFDM scheme, the RS 110 estimates an interference channel in a unit of burst, and compensates for a phase error based on any one symbol within a burst. Thus, in a case where the RS 110 estimates an interference channel by an average of a plurality of bursts, a problem occurs in that the RS 110 fails to compensate for a phase difference between bursts as illustrated in FIG. 2.

FIGS. 2A and 2B illustrate phase differences between bursts according to the related art.

In more detail, FIG. 2A illustrates a phase before compensating for phase errors of symbols, and FIG. 2B illustrates a phase after compensating for the phase errors of the symbols.

In a case of an OFDM scheme, each symbol constituting a receive signal has a different phase error as illustrated in FIG. 2A.

Thus, as illustrated in FIG. 2B, an RS compensates for a phase error based on any one symbol within each burst.

In a case of an FDR scheme, a transmit signal level of the RS is greater than a receive signal level. Therefore, the RS estimates an interference channel by an average of a plurality of bursts in order to accurately estimate a channel of a transmit signal functioning as interference in a receive signal. In this case, there occurs a problem that the RS cannot estimate an accurate interference channel because a phase error between bursts is different as illustrated in FIG. 2B.

Therefore, a need exists for an apparatus and method for estimating an accurate interference channel by compensating for phase error between bursts in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for estimating a self interference channel in a Relay Station (RS) of a wireless communication system using a Full Duplex Relay (FDR) scheme.

Another aspect of the present invention is to provide an apparatus and method for estimating an inter-antenna interference channel in an RS of a wireless communication system using an FDR scheme.

A further aspect of the present invention is to provide an apparatus and method for compensating for phase error between bursts for estimating an interference channel in an RS of a wireless communication system using an FDR scheme.

The above aspects are implemented by providing an apparatus and method for compensating for a phase error in a wireless communication system.

In accordance with an aspect of the present invention, an apparatus for compensating for a phase error in an RS of a wireless communication system using an FDR scheme is provided. The apparatus includes a reception modem, a transmission modem, a Common Phase Error (CPE) compensator, a first channel estimator, a phase compensator, and a second channel estimator. The reception modem demodulates and decodes a signal received through an antenna. The transmission modem encodes and modulates a signal for transmission to a receive end. The CPE compensator compensates for phase errors of at least two symbols constituting a signal provided from the reception modem. The first channel estimator estimates channels for respective bursts using a signal provided from the transmission modem and a signal provided from the CPE compensator. The phase compensator compares phases for the channels for the respective bursts provided from the first channel estimator with each other and compensates for a phase difference between at least two bursts. The second channel estimator estimates an interference channel considering channels for the at least two bursts compensated for the phase difference.

In accordance with another aspect of the present invention, a method for compensating for a phase error in an RS of a wireless communication system using an FDR scheme is provided. The method includes compensating for phase errors of at least two symbols constituting a signal received from a transmit end, estimating a channel for each burst using a signal for transmission to a receive end and a signal compensated for a phase error, comparing phases for channels for respective bursts with each other and compensating for a phase difference between at least two bursts, and estimating an interference channel considering channels for the at least two bursts compensated for the phase difference.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 7A, 7B, and 7C are graphs illustrating phases of phase-compensated bursts according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and method for compensating for a phase error between at least two bursts for estimating an interference channel in a wireless communication system using a Full Duplex Relay (FDR) scheme. Here, the interference channel denotes a self interference channel or an inter-antenna interference channel.

In an exemplary implementation, an assumption is made herein that a wireless communication system uses an Orthogonal Frequency Division Multiplexing/Orthogonal Frequency Division Multiple Access (OFDM/OFDMA) scheme.

Figure 1:
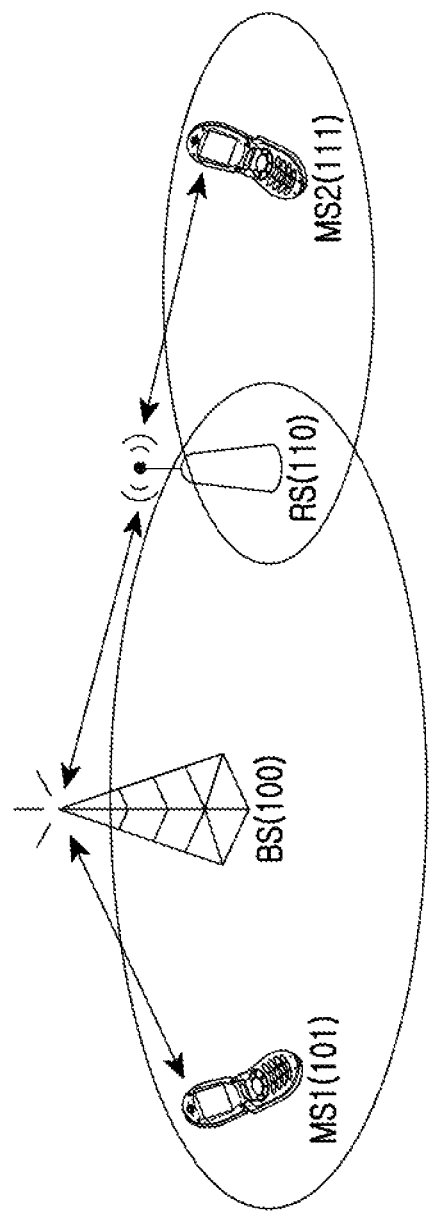
FIG. 1 is a diagram illustrating a construction of a wireless communication system providing a relay service according to the related art.
Figure 2:
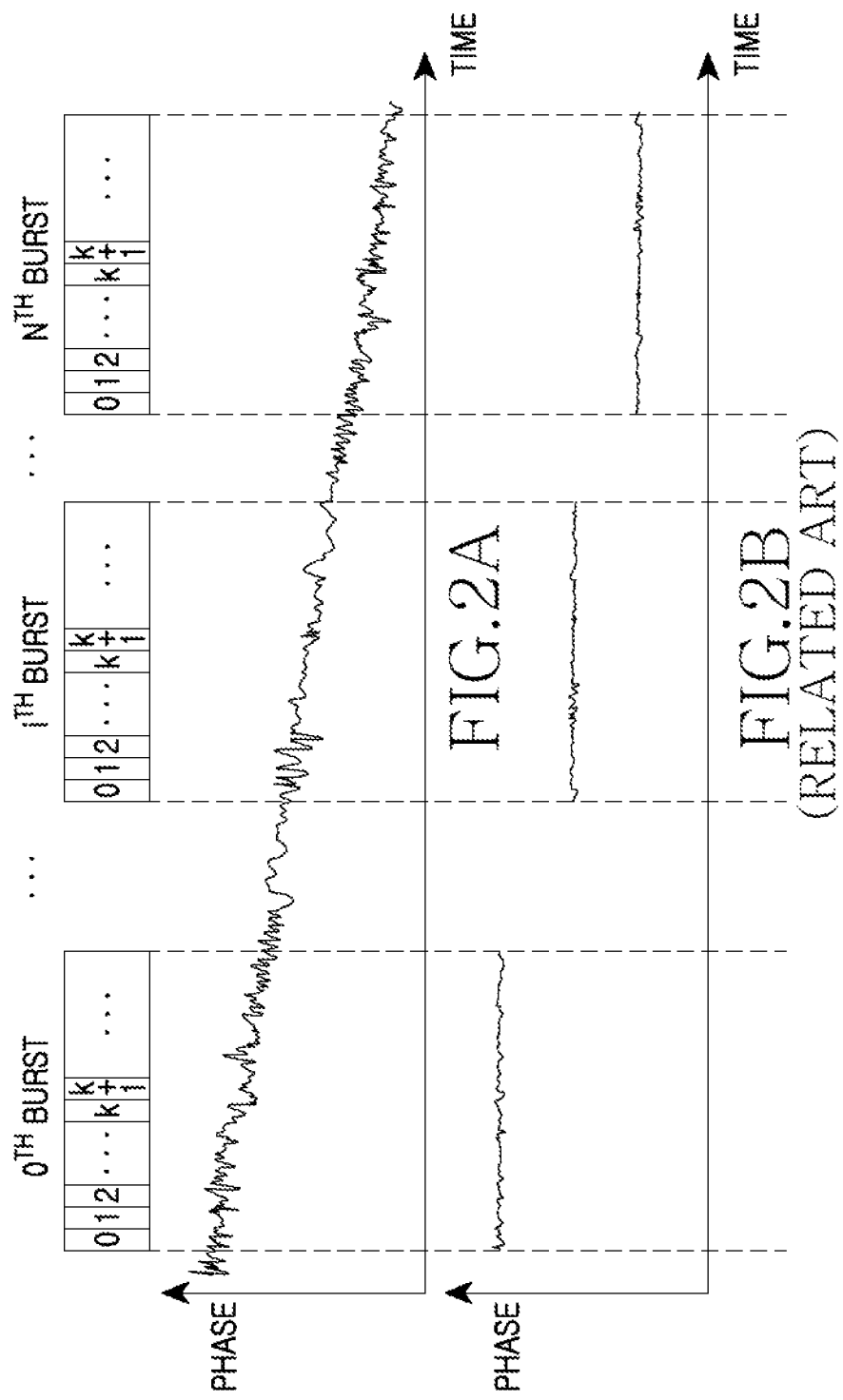
FIGS. 2A and 2B are graphs illustrating phase differences between bursts according to the related art.
Figure 3:
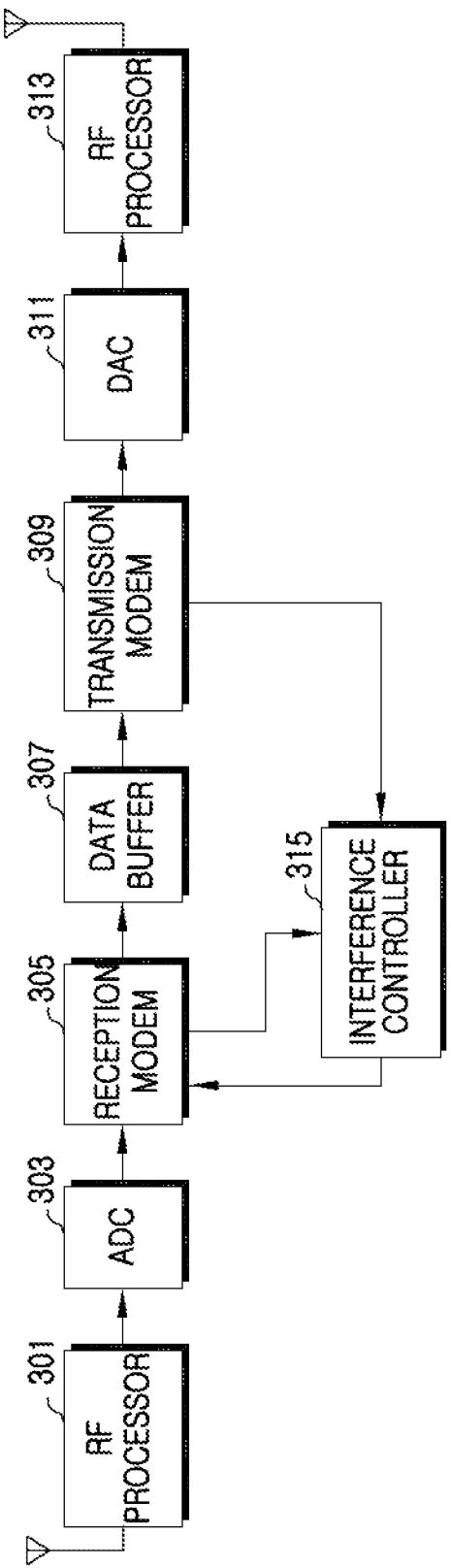
FIG. 3 is a block diagram illustrating a construction of a Relay Station (RS) using a Full Duplex Relay (FDR) scheme according to an exemplary embodiment of the present invention.

A Relay Station (RS) of the wireless communication system using the FDR scheme is constructed as illustrated in FIG. 3 below.

FIG. 3 is a block diagram illustrating a construction of an RS using Full Duplex Relay (FDR) scheme according to an exemplary embodiment the present invention.

Referring to FIG. 3, the RS includes Radio Frequency (RF) processors 301 and 313, an Analog to Digital Converter (ADC) 303, a reception modem 305, a data buffer 307, a transmission modem 309, a Digital to Analog Converter (DAC) 311, and an interference controller 315.

The RF processor 301 converts an RF signal received through a reception antenna into a baseband signal.

The ADC 303 converts a signal provided from the RF processor 301 into a digital signal.

The reception modem 305 demodulates and decodes a signal provided from the ADC 303. For example, the reception modem 305 includes an OFDM demodulator, an interference canceller, and a decoder. The OFDM demodulator converts the signal provided from the ADC 303 into a frequency domain signal through a Fast Fourier Transform (FFT) operation. The interference canceller cancels an interference signal in the signal provided from the OFDM demodulator, using an interference channel provided from the interference controller 315. The decoder demodulates and decodes the signal provided from the interference canceller.

The data buffer 307 temporarily stores a signal provided from the reception modem 305.

The transmission modem 309 encodes and modulates a signal provided from the data buffer 307. For example, the transmission modem 309 includes an encoder and an OFDM modulator. The encoder encodes and modulates the signal provided from the data buffer 307. The OFDM modulator converts the signal provided from the encoder into a time domain signal through an Inverse Fast Fourier Transform (IFFT) operation.

The DAC 311 converts a signal provided from the transmission modem 309 into an analog signal.

The RF processor 313 converts a signal provided from the DAC 311 into an RF signal, and outputs the RF signal through an antenna.

The interference controller 315 estimates an interference channel in which a signal transmitted through the transmission antenna functions as interference in the reception antenna. At this time, the interference controller 315 estimates a self interference channel or an inter-antenna interference channel using as a reference signal a signal output from the transmission modem 309. For example, the interference controller 315 is constructed as illustrated in FIG. 4 below.

As described above, the RS is constructed such that the RF processor 301, the ADC 303, and the reception modem 305 are separated from each other, and the transmission modem 309, the DAC 311, and the RF processor 313 are separated from each other.

In an exemplary implementation, an RS may be constructed such that a reception modem 305 includes an RF processor 301 and an ADC 303, and a transmission modem 309 includes a DAC 311 and an RF processor 313.

Figure 4:
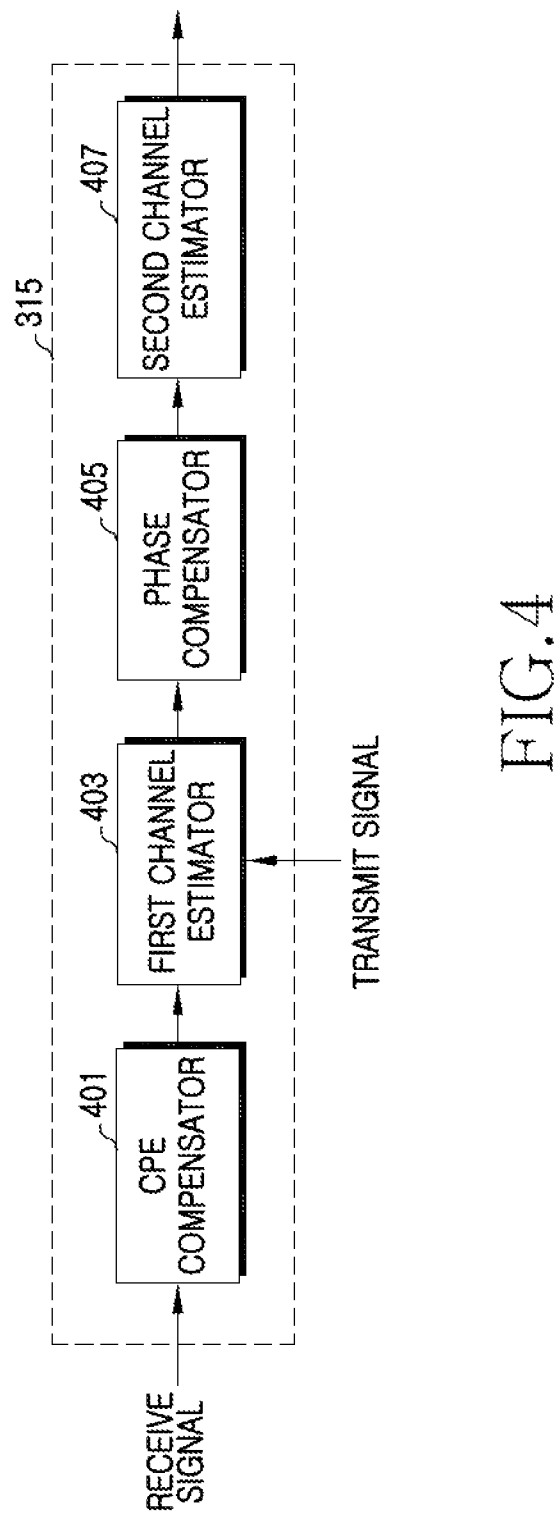
FIG. 4 is a block diagram illustrating a detailed construction of an interference controller in an RS using an FDR scheme according to an exemplary embodiment of the present invention.

FIG. 4 is a block diagram illustrating a detailed construction of an interference controller in an RS using an FDR scheme according to an exemplary embodiment of the present invention.

Referring to FIG. 4, the interference controller 315 includes a Common Phase Error (CPE) compensator 401, a first channel estimator 403, a phase compensator 405, and a second channel estimator 407.

The CPE compensator 401 compensates a receive signal, which is provided from the reception modem 305, for phase errors of symbols. For example, the CPE compensator 401 compensates for phase errors of symbols, which are included in a burst, based on any one symbol by burst of a receive signal.

The first channel estimator 403 estimates a channel for each burst using symbols whose phase errors are compensated in the CPE compensator 401 using as a reference signal a transmit signal provided from the transmission modem 309. For example, the first channel estimator 403 multiplies a phase-error-compensated receive signal provided from the CPE compensator 401 by a transmission signal from the transmission modem 309 and estimates a channel for each burst.

The phase compensator 405 compensates for phase differences of bursts using a channel estimated in the first channel estimator 403. For example, the phase compensator 405 compensates for phase differences of remaining bursts using, as a reference phase, a phase of any one of a plurality of bursts to estimate an interference channel in the second channel estimator 407. In another example, the phase compensator 405 may compensate for phase differences of remaining bursts using, as a reference phase, a phase of a first symbol of a first one of a plurality of bursts to estimate an interference channel in the second channel estimator 407. In a further example, the phase compensator 405 may compensate for phase differences of remaining bursts using, as a reference phase, a phase compensation value of symbols of a first one of bursts to estimate an interference channel in the second channel estimator 407.

The second channel estimator 407 determines an average of channels for 'N' number of bursts compensated for phase differences in the phase compensator 405. At this time, the second channel estimator 407 recognizes the channel average determined by itself, as an interference channel for a self interference signal or inter-antenna interference signal.

Figure 5:
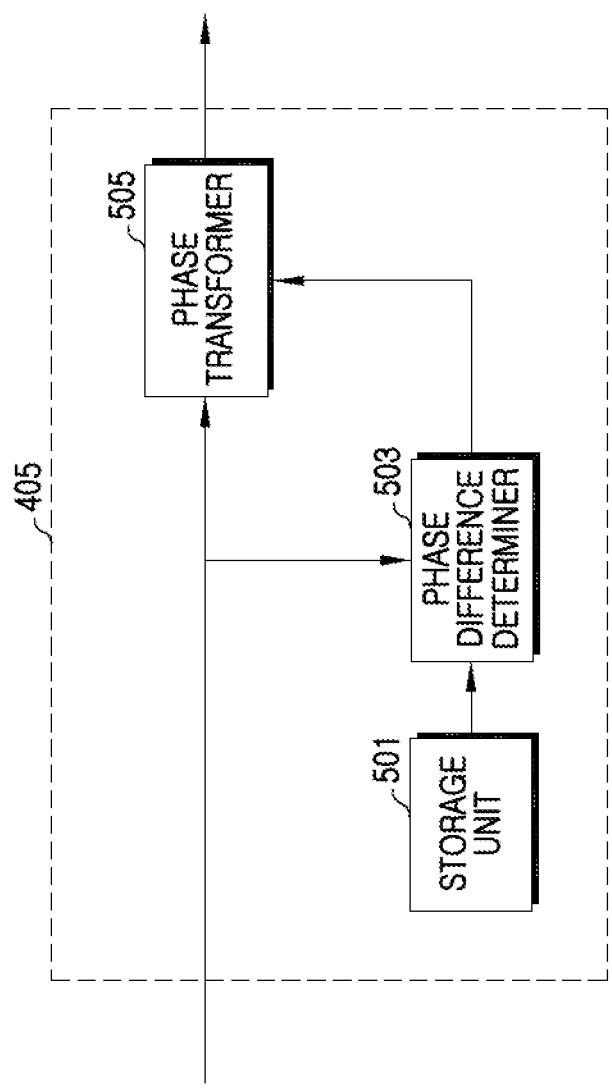
FIG. 5 is a block diagram illustrating a detailed construction of a phase compensator in an interference controller according to an exemplary embodiment of the present invention.

In the above-described construction of the interference controller 315, the phase compensator 405 is constructed as illustrated in FIG. 5 below.

FIG. 5 is a block diagram illustrating a detailed construction of a phase compensator in an interference controller according to an exemplary embodiment of the present invention.

Referring to FIG. 5, the phase compensator 405 includes a storage unit 501, a phase difference determiner 503, and a phase transformer 505.

The storage unit 501 stores a value set as a reference phase in the phase compensator 405. For example, the phase compensator 405 sets, as a reference phase, a phase of any one of a plurality of bursts to estimate an interference channel in the second channel estimator 407, and stores the reference phase in the storage unit 501. In another example, the phase compensator 405 sets, as a reference phase, a phase of a first symbol of a first one of a plurality of bursts to estimate an interference channel in the second channel estimator 407, and stores the reference phase in the storage unit 501. In a further example, the phase compensator 405 sets, as a reference phase, a phase compensation value of symbols of a first one of bursts to estimate an interference channel in the second channel estimator 407, and stores the reference phase in the storage unit 501.

The phase difference determiner 503 determines a difference between the reference phase stored in the storage unit 501 and the phase for the channel for the burst estimated in the first channel estimator 403.

The phase transformer 505 compensates for phase differences of bursts provided from the first channel estimator 403 using the phase difference provided from the phase difference determiner 503.

An operation method of an RS for estimating an interference channel is described in more detail below.

Figure 6:
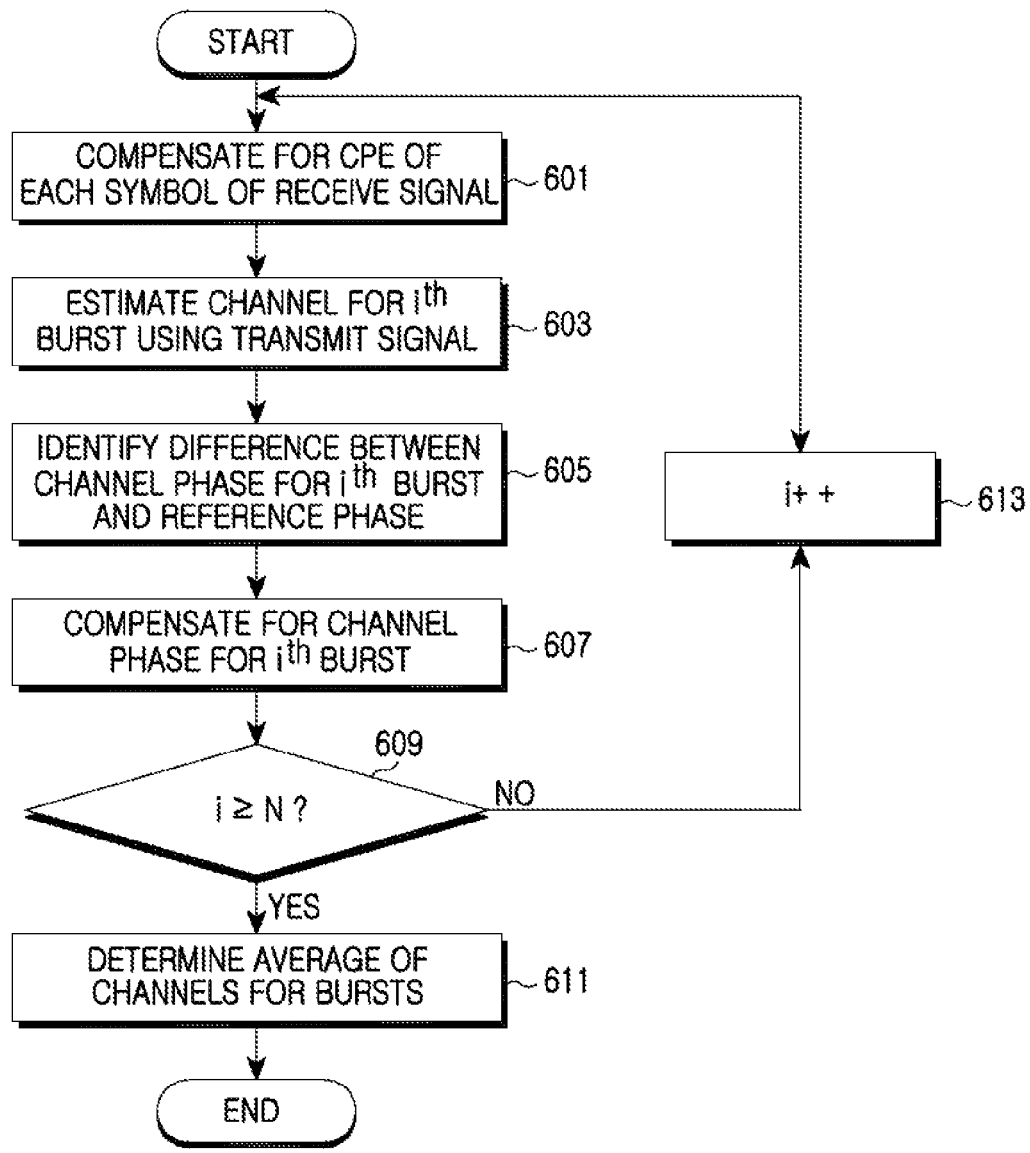
FIG. 6 is a flow diagram illustrating a procedure for compensating for a phase for a self interference channel in an RS using an FDR scheme according to an exemplary embodiment of the present invention.

FIG. 6 illustrates a procedure for compensating for a phase for a self interference channel in an RS using an FDR scheme according to an exemplary embodiment of the present invention.

Referring to FIG. 6, in step 601, the RS compensates for a phase error of each symbol included in a receive signal. For example, in a case of an OFDM scheme, each symbol constituting a receive signal has a different phase error as illustrated in FIG. 7A. Thus, as illustrated in FIG. 7B, the RS compensates for a phase error of each symbol based on any one of symbols constituting a burst.

After compensating for the phase errors of the symbols, the RS proceeds to step 603 and estimates a channel for an $i^{th}$ burst compensated for a phase error in step 601 based on a transmit signal. For example, the RS multiplies a receive signal compensated for a phase error by a transmit signal from the transmission modem 309, and estimates the channel for the $i^{th}$ burst. Here, the 'i' is an index of a burst used to estimate an interference channel, and has an initial value of '0'.

After estimating the channel for the $i^{th}$ burst, the RS proceeds to step 605 and identifies a difference between a channel phase of the $i^{th}$ burst and a reference phase. For example, the RS uses, as a reference phase, a phase of any one of 'N' number of bursts to estimate an interference channel. In another example, the RS can use, as a reference phase, a phase of a first symbol of a first one of 'N' number of bursts to estimate an interference channel. In a further example, the RS may use, as a reference phase, a phase compensation value of symbols of a first one of bursts to estimate an interference channel.

After determining the difference between the channel phase of the $i^{th}$ burst and the reference phase, the RS proceeds to step 607 and compensates for the determined difference between the channel phase of the $i^{th}$ burst and the reference phase. For example, bursts for estimating an interference channel have different phase differences as illustrated in FIG. 7B. Thus, the RS compensates for the channel phase of the $i^{th}$ burst considering a reference phase as illustrated in FIG. 7C.

The RS then proceeds to step 609 and identifies if it has compensated for phase differences of all bursts to estimate an interference channel. For example, in a case where the RS estimates an interference channel by an average of 'N' number of bursts, the RS compares an index (i) of the burst compensated for the phase difference in step 607 with 'N'. Here, the 'N' represents the number of bursts to estimate the interference channel.

In a case where the 'i' is less than the 'N' (i<N), the RS recognizes that it has not compensated for the phase differences of all bursts to estimate the interference channel. Thus, the RS proceeds to step 613 and increases the 'i' (i++).

The RS proceeds to step 601 and compensates for phase errors of symbols constituting a burst corresponding to the 'i' updated in step 613.

On the other hand, in a case where the 'i' is greater than or is equal to the 'N' (i≧N), the RS recognizes that it has compensated for the phase difference of all bursts to estimate the interference channel. Thus, the RS proceeds to step 611 and determines an average for channels for 'N' number of bursts, estimating an interference channel.

Thereafter, the RS terminates the procedure.

As described above, exemplary embodiments of the present invention have an advantage of, by compensating for a phase error between bursts to estimate an interference channel in an RS of a wireless communication system using an FDR scheme, accurately estimating a self interference channel or an inter-antenna interference channel, and reducing performance degradation resulting from channel estimation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for compensating for a phase error in a Relay Station (RS) of a wireless communication system using a Full Duplex Relay (FDR) scheme, the apparatus comprising:
   a reception modem configured to demodulate and decode a signal received through an antenna;
   a transmission modem configured to encode and demodulate a signal for transmission to a receive end;
   a Common Phase Error (CPE) compensator configured to compensate for phase errors of at least two symbols constituting a signal provided from the reception modem;
   a first channel estimator configured to estimate channels for respective bursts using a signal provided from the transmission modem and a signal provided from the CPE compensator;
   a phase compensator configured to compare phases for the channels for the respective bursts provided from the first channel estimator with each other and configured to compensate for a phase difference between at least two bursts; and
   a second channel estimator configured to estimate an interference channel considering channels for the at least two bursts compensated for the phase difference.

2. The apparatus of claim 1, wherein the CPE compensator compensates for a phase error of at least one remaining symbol based on any one of at least two symbols constituting a burst.

3. The apparatus of claim 1, wherein the phase compensator compensates for a phase difference of at least one remaining burst based on a phase of any one of the at least two bursts to estimate the interference channel in the second channel estimator.

4. The apparatus of claim 1, wherein the phase compensator compensates for a phase difference of at least one remaining burst based on a phase of a first symbol of a first one of the at least two bursts to estimate the interference channel in the second channel estimator.

5. The apparatus of claim 1, wherein the phase compensator compensates for a phase difference of at least one remaining burst based on a phase compensation value of symbols of a first one of the at least two bursts to estimate the interference channel in the second channel estimator.

6. The apparatus of claim 1, wherein the phase compensator comprises:
   a storage unit for storing a reference phase to compensate for a phase difference between bursts;
   a phase difference configured to determine a difference between the channel phase of the burst estimated in the first channel estimator and the reference phase; and
   a phase transformer configured to compensate each burst for the phase difference determined in the phase difference determiner.

7. The apparatus of claim 1, wherein the second channel estimator determines an average for the channels for the at least two bursts compensated for the phase difference.

8. The apparatus of claim 1, wherein the reception modem comprises:
   an Orthogonal Frequency Division Multiplexing (OFDM) demodulator configured to convert a receive signal into a frequency domain signal through a Fast Fourier Transform (FFT) operation;
   an interference canceller configured to cancel at least one of a self interference and an inter-antenna interference in a signal provided from the OFDM demodulator, using the interference channel estimated in the second channel estimator; and
   a decoder configured to demodulate and decode a signal provided from the interference canceller.

9. The apparatus of claim 1, wherein the transmission modem comprises:
   an encoder configured to encode and modulate a signal provided from the reception modem; and
   an OFDM modulator configured to convert a signal provided from the encoder into a time domain signal through an Inverse Fast Fourier Transform (IFFT) operation.

10. A method for compensating for a phase error in a Relay Station (RS) of a wireless communication system using a Full Duplex Relay (FDR) scheme, the method comprising:
   compensating for phase errors of at least two symbols constituting a signal received from a transmit end;

estimating a channel for each burst using a signal for transmission to a receive end and a signal compensated for a phase error;

comparing phases for channels for respective bursts with each other and compensating for a phase difference between at least two bursts; and estimating an interference channel considering channels for the at least two bursts compensated for the phase difference.

11. The method of claim 10, wherein the compensating for the phase error comprises compensating for a phase error of at least one remaining symbol based on any one of at least two symbols constituting a burst in a receive signal.

12. The method of claim 10, wherein the compensating for the phase difference comprises compensating for a phase difference of at least one remaining burst based on a phase of any one of the at least two bursts to estimate the interference channel.

13. The method of claim 10, wherein the compensating for the phase difference comprises compensating for a phase difference of at least one remaining burst based on a phase of a first symbol of a first one of the at least two bursts to estimate the interference channel.

14. The method of claim 10, wherein the compensating for the phase difference comprises compensating for a phase difference of at least one remaining burst based on a phase compensation value of symbols of a first one of the at least two bursts to estimate the interference channel.

15. The method of claim 10, wherein the compensating for the phase difference comprises:

identifying a reference phase to compensate for a phase difference between bursts;

determining a difference between a channel phase of a burst and the reference phase; and compensating respective bursts for the determined phase difference.

16. The method of claim 10, wherein the estimating of the interference channel determines an average of the channels for the at least two bursts compensated for the phase difference.

17. The method of claim 10, further comprising:

before the compensating for the phase errors of the symbols, converting a signal received from the transmit end into a frequency domain signal through a Fast Fourier Transform (FFT) operation.

18. The method of claim 17, further comprising:

after the estimating of the interference channel, canceling at least one of a self interference and an inter-antenna interference in the frequency domain signal using the interference channel; and demodulating and decoding the signal for canceling the at least one of the self interference and the inter-antenna interference.

19. The method of claim 17, further comprising:

while receiving a signal from the transmit end, encoding and modulating a signal previously received from the transmit end;

converting the encoded and modulated signal into a time domain signal through an Inverse Fast Fourier Transform (IFFT) operation; converting the time domain signal into a Radio Frequency (RF) signal; and transmitting the RF signal to the receive end.

* * * * *